United States Patent
Yamada et al.

(10) Patent No.: US 7,270,432 B2
(45) Date of Patent: Sep. 18, 2007

(54) MIRROR AND ANGLE DETECTION APPARATUS

(75) Inventors: Ayako Yamada, Fujieda (JP); Hidenori Sato, Fujieda (JP)

(73) Assignee: Murakami Corporation, Shizuoka-shi (JP)

(*) Notice: Subject to any disclaimer, the term of this patent is extended or adjusted under 35 U.S.C. 154(b) by 0 days.

(21) Appl. No.: 11/195,761

(22) Filed: Aug. 3, 2005

(65) Prior Publication Data
US 2006/0029376 A1    Feb. 9, 2006

(30) Foreign Application Priority Data
Aug. 5, 2004    (JP) .............. 2004-229745

(51) Int. Cl.
*B60R 1/072*    (2006.01)
(52) U.S. Cl. .................... 359/874; 359/877
(58) Field of Classification Search ........ 359/871–874, 359/876, 877, 881
See application file for complete search history.

(56) References Cited

U.S. PATENT DOCUMENTS

| | | | | |
|---|---|---|---|---|
| 5,064,274 | A * | 11/1991 | Alten | 359/604 |
| 5,993,018 | A * | 11/1999 | Hattori et al. | 359/877 |
| 6,412,960 | B1 * | 7/2002 | Yoshida et al. | 359/843 |
| 2004/0047054 | A1 * | 3/2004 | Kikuchi | 359/877 |
| 2004/0114261 | A1 * | 6/2004 | Ohashi | 359/872 |
| 2005/0225886 | A1 * | 10/2005 | Yamada | 359/877 |
| 2006/0028745 | A1 * | 2/2006 | Yamada | 359/877 |
| 2006/0066966 | A1 * | 3/2006 | Yamada et al. | 359/872 |
| 2006/0066968 | A1 * | 3/2006 | Yamada | 359/877 |

FOREIGN PATENT DOCUMENTS

JP    3-112441    11/1991

OTHER PUBLICATIONS

U.S. Appl. No. 11/194,538, filed Aug. 2, 2005, Yamada.
U.S. Appl. No. 11/195,761, filed Aug. 3, 2005, Yamada et al.
U.S. Appl. No. 11/230,570, filed Sep. 21, 2005, Yamada.
U.S. Appl. No. 11/235,211, filed Sep. 27, 2005, Yamada et al.
U.S. Appl. No. 11/235,193, filed Sep. 27, 2005, Yamada et al.

* cited by examiner

*Primary Examiner*—Mark A. Robinson
*Assistant Examiner*—Mark Consilvio
(74) *Attorney, Agent, or Firm*—Oblon, Spivak, McClelland, Maier & Neustadt, P.C.

(57) ABSTRACT

A mirror (18) having a specular surface changeable in orientation using an actuator (16) is provided with an angle detection capability at reduced cost. A plate pivot (10) can change its orientation together with the specular surface so as to orient in a direction in which the specular surface is orienting. A slide block (20) is stressed toward the plate pivot (10) so that rotation of the plate pivot (10) causes the slide block (20) to move in a direction substantially perpendicular to the specular surface by an amount proportional to an amount of the rotation of the plate pivot (10). A magnet (26) moves in the direction of movement of the slide block (20) by an amount proportional to an amount of the movement of the slide block (20), and a magnetism sensing element (202) detects magnetism derived from the magnet (26) and outputs a signal corresponding to the amount of movement of the magnet (26).

17 Claims, 5 Drawing Sheets

<NEUTRAL POSITION>

<UPPER POSITION>

<LOWER POSITION>

MIRROR AND ANGLE DETECTION APPARATUS

CROSS REFERENCE TO RELATED

The present application claims priority under 35 U.S.C. § 119 of Japanese Patent Application No. 2004-229745, filed on Aug. 5, 2004, entitled MIRROR AND ANGLE DETECTION APPARATUS". The contents of that application are incorporated herein by reference in their entirety.

BACKGROUND OF THE INVENTION

This invention relates to a mirror and an angle detection apparatus therefor.

A mirror angle detection apparatus having a magnet fixed on a plate pivot (pivot table) of a mirror assembly and a magnetism sensor provided in an angle changing actuator assembly is known in the art (see Japanese Utility Model Application, Laid-Open No. 3-112441 U). The magnetism sensor or magnetism sensing element used therein detects a variation in magnetic field resulting from inclination or angular displacement of a specular surface of the mirror assembly.

Figure 5:
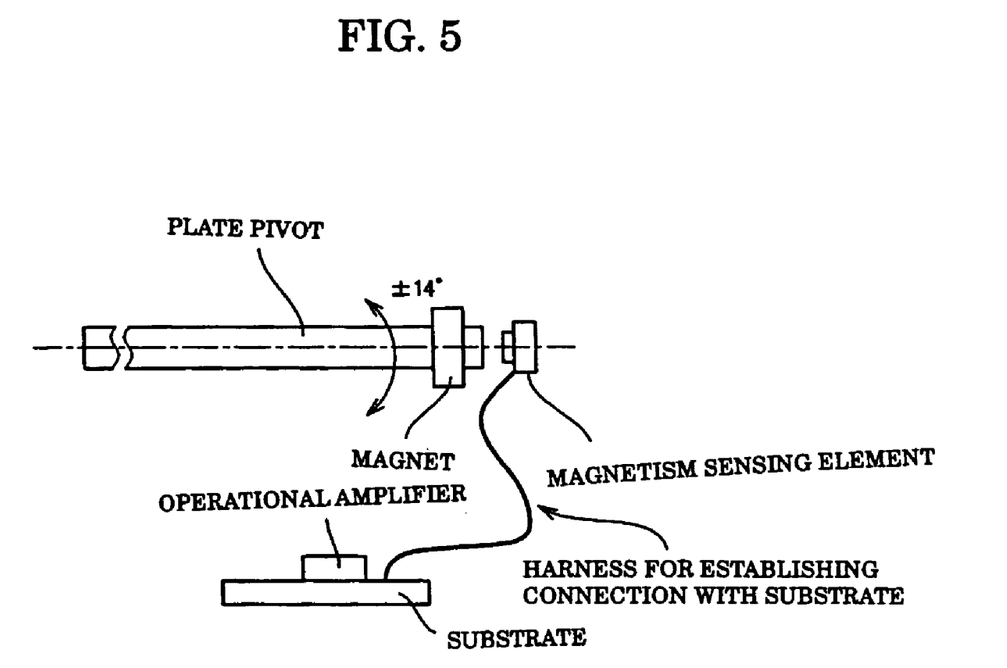
FIG. 5 shows an apparatus for detecting an angle of a specular surface using a magnet fixed on a plate pivot.

In this conventional construction, however, in order to detect a whole range of angular displacement of the specular surface using the magnet fixed on the plate pivot, the size of the magnet to be used should be large enough to cover the movement of the plate pivot. Further, in order to appropriately detect a variation in magnetic field resulting from the inclination of the specular surface, for example as shown in FIG. 5, the center of rotation of the plate pivot, the magnet and the neutral position of the magnetism sensing element should be arranged in proper alignment along one and the same line. This would impose a restriction in layout, and thus affect space efficiency in some instances, in designing a mirror with angle detection capability. In actuality, effective use of space would be greatly desired for example in an exterior mirror for an automobile in that the space available within the mirror body is limited and at a premium.

In addition, the actuator for tilting the specular surface should be selected from those designed specifically for angle detection, which would thus only be available with angle detection apparatus, and cost-effective general-purpose actuators would not be applicable. Moreover, in most cases, particularly where a special wiring arrangement such as a harness is provided to establish connection from a substrate to the magnetism sensing element disposed near the magnet, such a complicate construction would impair the workability of wiring, and thus increase the manufacturing cost.

Under the circumstances, it would be desirable to provide a mirror and an angle detection apparatus therefor in which the above-described disadvantages are eliminated.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION (Arrangement 1)

In one aspect of the present invention, a mirror having a specular surface changeable in orientation is provided. The mirror comprises: an actuator adapted to rotate the specular surface about an axis parallel with the specular surface to change the orientation of the specular surface; an interlocking member adapted to change orientation thereof together with the specular surface so as to orient in a direction in which the specular surface is orienting; a slide block stressed toward the interlocking member so that rotation of the interlocking member causes the slide block to move in a direction of movement substantially perpendicular to the specular surface by an amount proportional to an amount of the rotation of the interlocking member; a movable member adapted to move in the direction of movement of the slide block by an amount proportional to an amount of the movement of the slide block; and a moving amount detection unit adapted to detect the amount of movement of the movable member.

According to the structural features defined above, the angle of the specular surface can be appropriately detected. Moreover, the slide block, a guide case, the movable member and other components, which would otherwise need to be positioned at severely limited locations respectively in proper alignment, may be disposed at any locations respectively on a vertical or horizontal line with respect to the mirror. The "vertical" line with respect to the mirror denotes a vertical axis about which the specular surface is rotated or swiveled, while the "horizontal" line with respect to the mirror denotes a horizontal axis about which the specular surface is rotated or tilted. Further, according to the above features of the present invention, the degree of flexibility in arrangement can be increased, which makes it possible to utilize spaces (e.g., spaces around the actuator or that which would otherwise be occupied by the actuator) within the mirror, thus improving the space efficiency. The actuator with angle detection capability can be miniaturized. Alternatively, an angle detection capability can be added easily to any general-purpose actuator.

It is to be understood that the "direction of movement substantially perpendicular to the specular surface" denotes the direction perpendicular to the specular surface that is not tilted or swiveled. The mirror may include an exterior mirror (e.g., exterior rearview mirror) for use with an automobile.

The interlocking member may include for example a mirror holder, a housing, and other components that are adapted to passively move in accordance with the movement of the mirror; alternatively, the interlocking member may include for example a plate pivot and like other components that are adapted to actively move to drive the specular surface. The interlocking member may constitute a part of the specular surface. The slide block, the movable member, and the moving amount detection unit may be arranged in alignment with any of the specular surface, the mirror holder, the plate pivot, the housing and other components that make up the mirror. The slide block, the movable member and the moving amount detection unit may be arranged inside or outside the actuator.

(Arrangement 2)

The interlocking member may comprise a plate pivot adapted to rotate about the axis parallel with the specular surface so as to tilt the specular surface. With this construction, the specular surface can be appropriately detected without the necessity to add the interlocking member as a separate member. The slide block is stressed, for example, toward a back side of the plate pivot. The back side is the side facing toward the same direction as the back of the mirror.

(Arrangement 3)

The mirror may further comprises: a first elastic member provided between the movable member and the slide block to stress the slide block toward the interlocking member; and a second elastic member adapted to stress the movable member toward the first elastic member, wherein movement of the slide block causes the movable member to move in the direction of the movement of the slide block by an amount smaller than the amount of the movement of the slide block.

With this construction, properly adjusted balance of action and reaction of the first and second elastic members makes it possible to convert the movement of the specular surface into any predefined amount of movement of the movable member. The smaller amount of movement of the movable member contributes to reduced size of the movable member and to reduced cost of manufacturing the mirror. Further, adjustment made to the balance of the action and reaction of the first and second elastic member makes it possible to set a neutral position of the movable member at any desired position. The first and/or second elastic members may be comprised for example of a coil spring. Any other elastic member such as leaf springs may be employed as the first and/or second elastic members.

(Arrangement 4)

The movable member used in the above arrangements may comprise a magnet; and the moving amount detection unit may comprise a magnetism sensing element adapted to detect magnetism derived from the magnet to output a signal corresponding to the amount of the movement of the magnet. As a result, the amount of movement of the magnet as a movable member can be appropriately detected.

(Arrangement 5)

A circuit board opposed to the interlocking member may be provided with the slide block and the magnet disposed between the circuit board and the interlocking member, and the magnetism sensing element may be mounted on the circuit board. As a result, a neutral position of the magnet can be set at any desired position; thus, if a magnetism sensing element for example of the lead type is mounted on the circuit board, the magnetism derived from the magnet can be detected without the necessity to use a special wiring arrangement such as a harness. Accordingly, the workability in wiring is improved, and the cost of manufacturing the mirror can be reduced.

(Arrangement 6)

The above magnet may have a length shorter in a direction substantially perpendicular to the specular surface than a maximum distance covered by the movement of the slide block corresponding to a maximum range of rotation of the specular surface. By employing the magnet having a smaller size, the cost of manufacturing the mirror can be reduced.

(Arrangement 7)

The above magnetism sensing element may comprise a Hall element applying a Hall voltage between first and second voltage output terminals. The mirror may further comprise: first and second temperature-compensating elements having a resistance decreasing or increasing according to increase in temperature, the first and second temperature-compensating elements connected to the first and second voltage output terminals respectively; and an operational amplifier adapted to amplify the Hall voltage received from the Hall element through the first and second temperature-compensating elements.

With this construction, the amount of rotation of the specular surface can be appropriately converted into an electrical signal. In addition, the temperature-compensating elements serve to compensate the temperature characteristics of the magnet and the magnetism sensing element. Accordingly, temperature dependence in angle detection can be restricted, so that high performance can be achieved. The temperature-compensating elements may include, for example, a thermistor or thermal resistor, and the like.

(Arrangement 8)

In another aspect of the present invention, an angle detection apparatus for detecting an angle of a specular surface is provided. The angle detection apparatus comprises: a slide block stressed toward an interlocking member so that rotation of the interlocking member causes the slide block to move in a direction of movement substantially perpendicular to the specular surface by an amount proportional to an amount of the rotation of the interlocking member adapted to change orientation thereof together with the specular surface so as to orient in a direction in which the specular surface is orienting; a movable member adapted to move in the direction of movement of the slide block by an amount proportional to an amount of the movement of the slide block; and a moving amount detection unit adapted to detect the amount of movement of the movable member. This arrangement produces the same advantageous effects as described above for Arrangement 1.

According to the present invention as exemplified by the above arrangements, advantageously, the cost of manufacturing a mirror having an angle detection capability can be reduced.

BRIEF DESCRIPTION OF THE DRAWINGS

The above aspects, other advantages and further features of the present invention will become more apparent by describing in detail illustrative, non-limiting embodiments thereof with reference to the accompanying drawings, in which:

FIGS. 2A and 2B are diagrams for explaining an exemplary operation of the mirror of FIG. 1, in which

DETAILED DESCRIPTION OF THE EXEMPLARY EMBODIMENTS

A detailed description will be given hereafter of an exemplary embodiment of the present invention with reference to the drawings.

Figure 1:
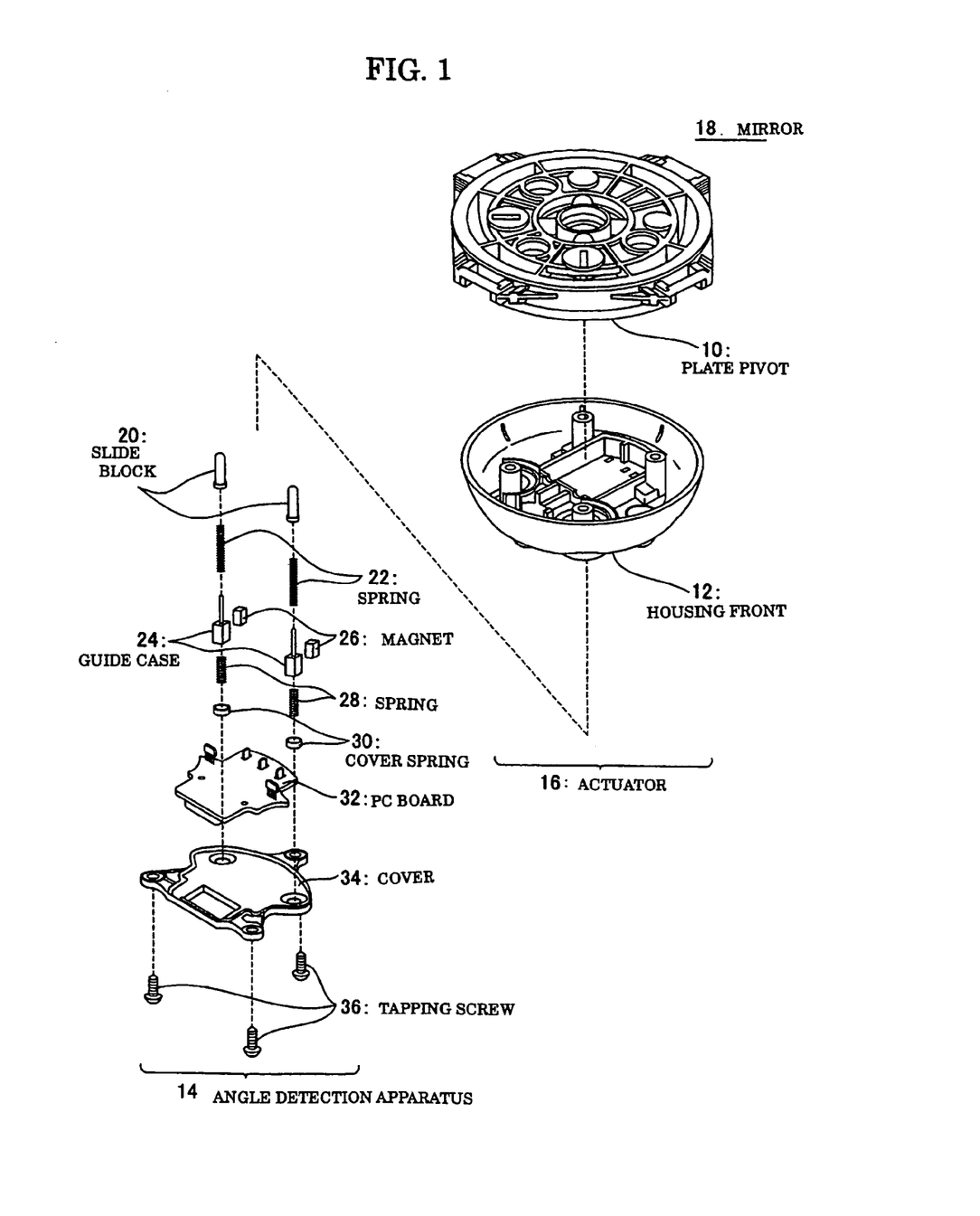
FIG. 1 is an exploded view of a mirror according to one exemplary embodiment of the present invention.

FIG. 1 shows a mirror 18 according to one exemplary embodiment of the present invention. In FIG. 1, various components other than principal portions necessary to detect an angle of a specular surface are not illustrated for the sake of clarity. It is to be understood the mirror 18 also includes other components that are not illustrated, such as a mirror body and a specular surface.

In the present embodiment, the mirror 18 is an exterior mirror for an automobile, which includes an actuator 16 and an angle detection apparatus 14. The actuator 16 includes a housing front 12 and a plate pivot 10.

The housing front 12 is a housing for holding the plate pivot 10. The plate pivot 10 is one example of an interlocking member adapted to rotate about an axis parallel with the specular surface of the mirror 18 so as to tilt the specular surface. To this end, the plate pivot 10 is adapted to change its orientation together with the specular surface so as to orient in a direction in which the specular surface is orienting. The actuator 16 is adapted to rotate the specular surface using the plate pivot 10 to change the orientation of the specular surface.

The angle detection apparatus 14 includes slide blocks 20, springs 22, guide cases 24, magnets 26, springs 28, cover springs 30, a PC board 32, a cover 34, and tapping screws 36. In the present embodiment as illustrated in FIG. 1, two sets of the components 20, 22, 24, 26, 28 and 30 are provided to detect two kinds of angular displacement of the specular surface which are caused by rotation of the specular surface about the vertical and horizontal axes, respectively, though the number of these components may be configured otherwise.

The slide blocks 20 are stressed by the springs 22, respectively, toward the back side of the plate pivot 10, while the housing front 12 is disposed between the slide blocks 20 and the back side of the plate pivot 10. Rotation of the plate pivot 10 causes the slide blocks 20 to move in a direction of movement substantially perpendicular to the specular surface by an amount proportional to an amount of the rotation of the plate pivot 10. The slide blocks 20 may be inserted in holes provided in the housing front 12 so that tips of the slide blocks 20 protruding through the holes of the housing front 12 are brought into contact with and pressed on the plate pivot 10.

Each spring 22, which is one example of a first elastic member, is disposed between magnet 26 and slide block 20 corresponding thereto, and serves to stress the slide block 20 toward the plate pivot 10. Each guide case 24 serves as a casing for accommodating magnet 26 corresponding thereto to hold the magnet 26 between spring 22 and spring 28 corresponding thereto. Magnet 26 is one example of a movable member, and a permanent magnet is employed therefor in the present embodiment. Spring 28 is one example of a second elastic member, and adapted to stress guide case 24 corresponding thereto to thereby stress the magnet 26 accommodated in the guide case 24 toward the spring 22. Cover spring 30 is provided to support an end of each spring 28 farther from the magnet 26.

With this construction, properly adjusted balance of action and reaction of the spring 22 and the spring 28 makes it possible to convert the movement of the specular surface into any predefined amount of movement of the magnet 26. Moreover, with this construction, the movement of the slide block 20 in a direction substantially perpendicular to the specular surface causes the magnet 26 to move in the same direction as the direction of the movement of the slide block 20 by an amount proportional to and smaller than the amount of the movement of the slide block 20. The angle detection apparatus 14 may alternatively be designed to include any other kinds of elastic members such as leaf springs, etc., instead of helical springs 22, 28 as shown in FIG. 1, as first and/or second elastic members.

The PC board 32 is a circuit board on which peripheral circuits such as angle detection circuit are mounted. The PC board 32 is opposed to the plate pivot 10 with the slide blocks 20, springs 22, guide cases 24, magnets 26, springs 28 and cover springs 30 disposed between the PC board 32 and the plate pivot 10. The cover 34 are designed to fit to the housing front 12 to form a cover for accommodating the slide blocks 20, springs 22, guide cases 24, magnets 26, springs 28, cover springs 30 and PC board 32. The tapping screws 36 are used to fix the cover 34 to the housing front 12.

According to the construction as described above, the following advantages can be achieved: the angle of the specular surface can be appropriately detected; the angle detection apparatus 14 can be arranged at any desired location on a vertical or horizontal line with respect to the mirror 18; the increased flexibility in layout design facilitates the utilization of spaces around the actuator 16 or that which would otherwise be occupied by the actuator 16, thus improves the space efficiency; an actuator unit composed of the angle detection apparatus 14 and the actuator 16 can be provided in reduced size; and the angle detection apparatus 14 can be retrofitted to the actuator 16, so that a general-purpose actuator provided off the shelf in the market can be used as the actuator 16. As a result, according to the present embodiment, the cost of the mirror 18 can be reduced.

Figure 2A:
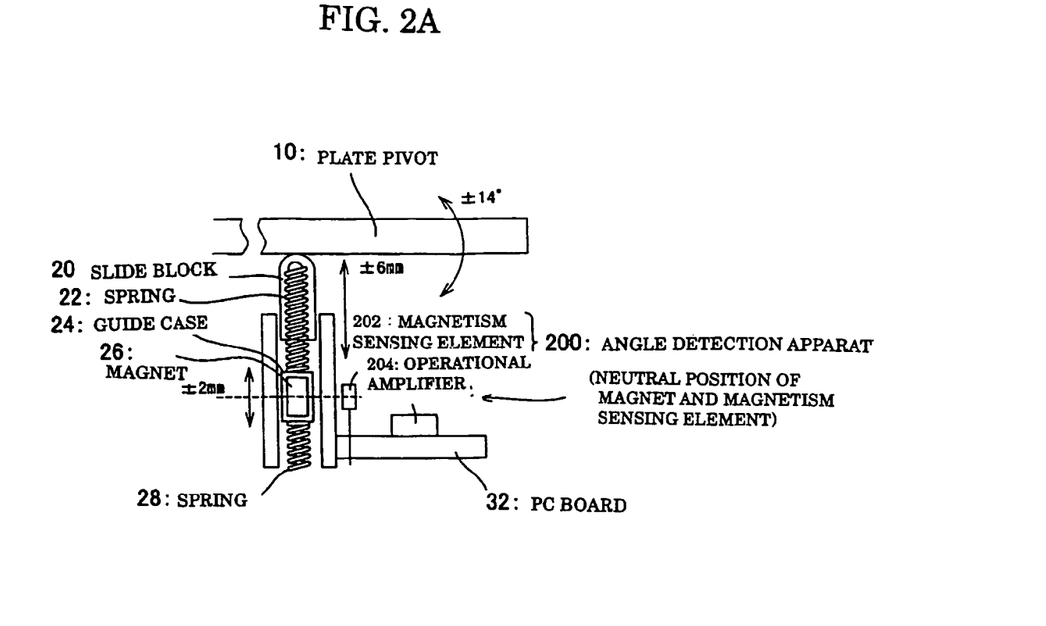
FIG. 2A illustrates an angle detection apparatus in operation.
Figure 2B:
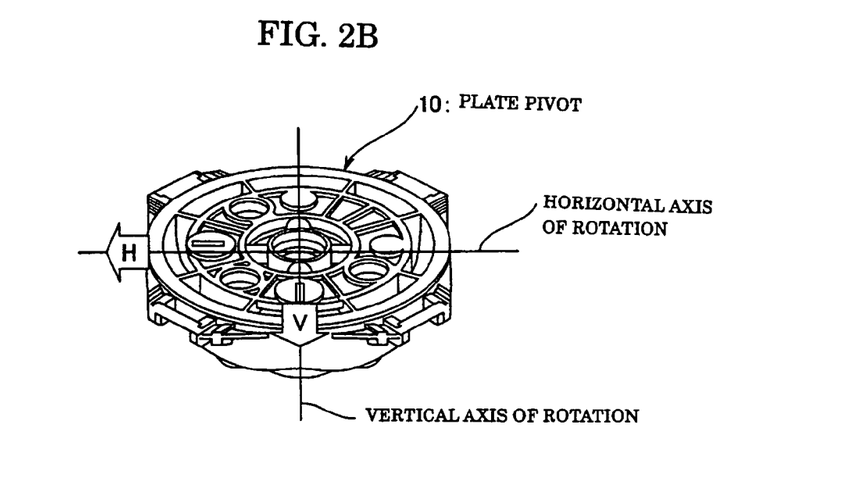
FIG. 2B illustrates an plate pivot in operation.

FIGS. 2A and 2B are diagrams showing an exemplary operation of the mirror 18. FIG. 2A illustrates the angle detection apparatus 14 in operation. In the present embodiment, the PC board 32 is provided with an angle detection circuit 200 including a magnetism sensing element 202 and an operational amplifier 204. The magnetism sensing element 202 is one example of the moving amount detection unit according to the present invention. The magnetism sensing element 202 is a Hall element or Hall sensor of the lead type, and mounted on the PC board 32.

In this embodiment, it is assumed by way of example that the plate pivot 10 is adapted to rotate in a range of ±14 degrees to drive the specular surface of the mirror 18. As the plate pivot 10 rotates in the range of ±14 degrees, the slide block 20 moves linearly in the range of ±6 mm. Thus, the slide block 20 converts rotational motion into rectilinear motion.

The spring 28 has a spring constant different from that of the spring 22. Therefore, when the slide block 20 moves, the magnet 26 sandwiched between the spring 22 and the spring 28 moves in the direction in which the slide block 20 moves, and by an amount of movement different from the amount by which the slide block 20 moves. In the present embodiment, by adjusting the balance of loads applied by the spring 22 and the spring 28, for example, the slide block 20 moves linearly in the range of ±6 mm, and the magnet 26 moves linearly in the range of ±2 mm, accordingly.

In this way, according to the present embodiment, the movement of the magnet 26 can be restricted within a smaller range, which thus makes it possible to use the magnet 26 smaller in size than that which would otherwise be required if the same maximum distance of movement of the slide block 20 is desired. Hereupon, the maximum distance of movement of the slide block 20 is the distance of movement covered by the slide block 20 corresponding to the permissible range of rotation of the specular surface. With this construction, the use of smaller magnet 26 reduces the cost of the mirror 18. In addition, spaces within the mirror 18 can be saved efficiently.

Moreover, by changing the balance of loads of the spring 22 and the spring 28, the neutral position of the magnet 26 can be adjusted as desired to a neutral position corresponding to the neutral position of the magnetism sensing element 202. This obviates the necessity for positioning the magnetism sensing element near the magnet 26 by making use of a harness, a flexible board, or the like. As a result, according to the present embodiment, the workability of mounting the magnetism sensing element 202 is improved, so that the cost of the mirror 18 can be reduced.

FIG. 2B illustrates the plate pivot 10 in operation. In this embodiment, the plate pivot 10 rotates about axes, namely, the vertical axis of rotation and the horizontal axis of rotation, respectively.

For that purpose, in the angle detection apparatus 14, a plurality of slide blocks 20 are each located at any point on the vertical axis of rotation or on the horizontal axis of rotation. The magnets 26, the magnetism sensing elements 202 and other components corresponding to the respective slide blocks 20 are located in the positions corresponding to the positions in which the corresponding slide blocks 20 are located.

In this instance, the slide blocks 20 can be located in any positions on the vertical axis of rotation or on the horizontal axis of rotation. Therefore, the angle detection apparatus 14 can be arranged in the spaces around the actuator 16 or that which would otherwise be occupied by the actuator 16. As a result, according to the present embodiment, spaces within the mirror 18 can be utilized effectively.

Figure 3A:
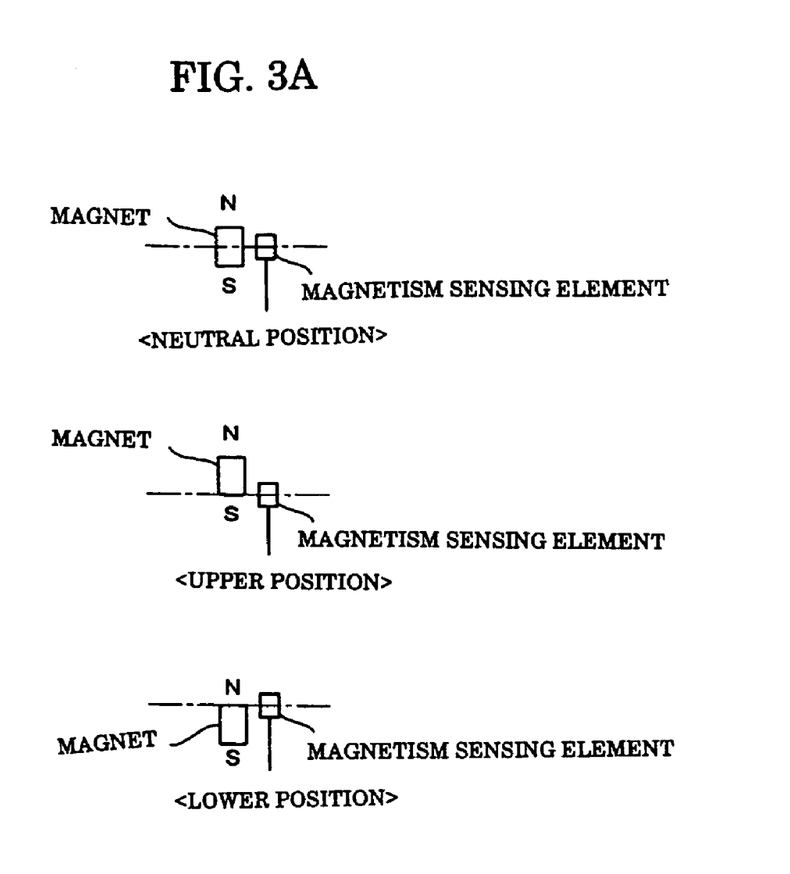
FIGS. 3A and 3B are diagrams for explaining a relationship between the size of a magnet and the operation of a magnetism sensing element.
Figure 3B:
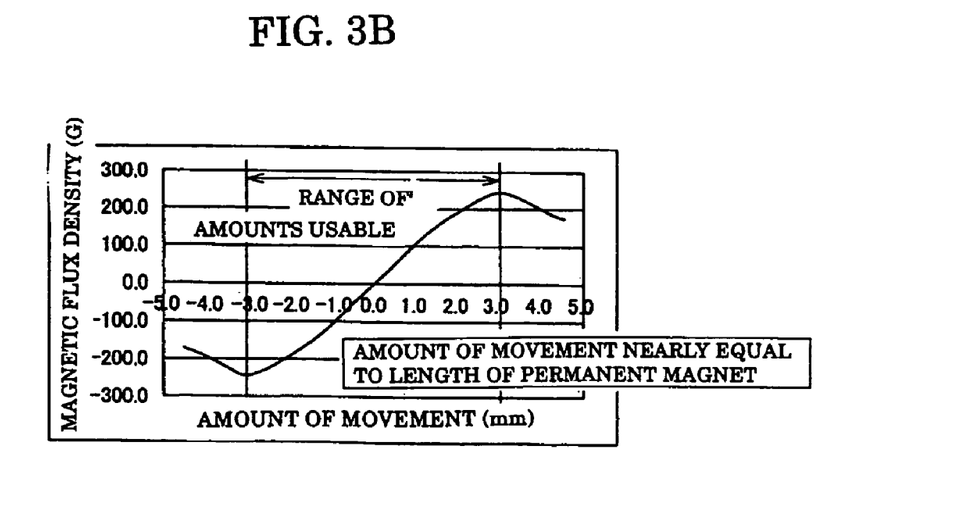

FIGS. 3A and 3B are diagrams for explaining a relationship between the size of a magnet and the operation of a magnetism sensing element. When the magnet is slid, as shown in FIG. 3A, upward and downward from the neutral position of the magnetism sensing element, the magnetism sensing element comprised of a Hall element according to the present invention detects magnetic flux density for example as shown in FIG. 3B.

To give an example where the magnet having the length of 6 mm is slid relative to the magnetism sensing element, the sliding movement of the magnet over the range of ±3 mm causes the direction of output to be reversed. Therefore, when a linear characteristic in the amount of the sliding movement is desired, it is necessary to satisfy the expression:

AMOUNT OF SLIDING MOVEMENT≈LENGTH OF PERMANENT MAGNET.

In the present embodiment, the balance of loads of the spring 22 and the spring 28 is adjusted to convert the motion of the spring 22 moving in the range of ±6 mm to a smaller motion of the magnet 26 moving in the range of ±2 mm. Therefore, the amount of movement to be detected becomes smaller so that the magnet 26 to be used can be selected among smaller ones.

Figure 4A:
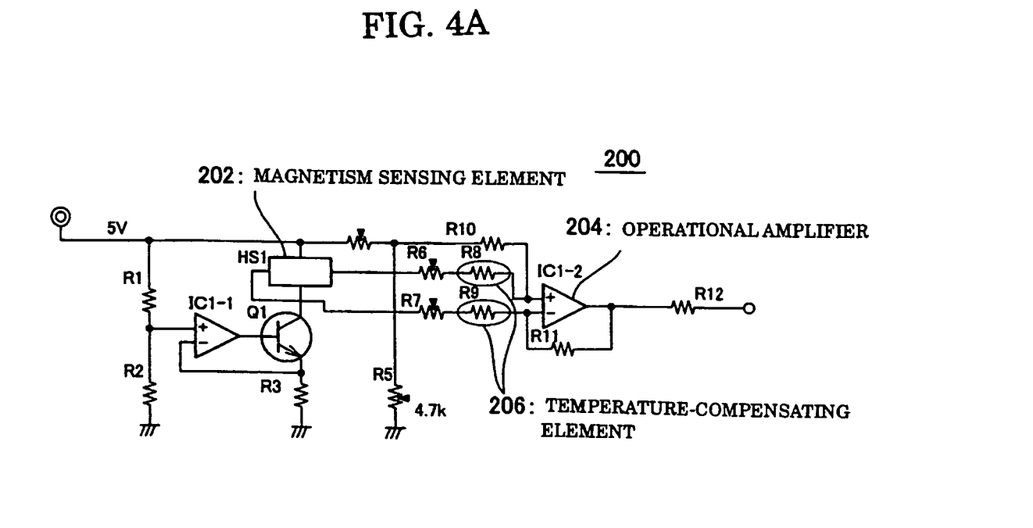
FIG. 4A is an exemplified schematic circuit diagram of an angle detection apparatus.

FIG. 4A is an exemplified schematic circuit diagram of the angle detection apparatus 200. In the present embodiment, the angle detection apparatus 200 includes a magnetism sensing element 202, a plurality of temperature-compensating elements 206, and an operational amplifier 204.

The magnetism sensing element 202 is a Hall element, and adapted to output a Hall voltage in accordance with magnetism detected, based upon a current supplied from a constant-current circuit comprised of a voltage follower IC1-1, a transistor Q1 and other components. The magnetism sensing element 202 outputs the Hall voltage as a differential between a first voltage output terminal connected through a resistor R6 to a temperature-compensating element 206 (R8) and a second voltage output terminal connected through a resistor R7 to a temperature-compensating element 206 (R9).

The plurality of temperature-compensating elements 206 are thermisters or thermal resistors adapted to decrease its resistance in accordance with increase in temperature. The plurality of temperature-compensating elements 206 are connected to the first and second voltage output terminals of the magnetism sensing elements 202, respectively, to thereby compensate temperature characteristics of the magnet 26 and magnetism sensing element 202. The operational amplifier 204 amplifies a Hall voltage received through the plurality of temperature-compensating elements 206 from the magnetism sensor 202. Depending upon the circuitry of the angle detection circuit 200, the temperature-compensating elements 206 to be used may be adapted to increase its resistance in accordance with increase in temperature.

Figure 4B:
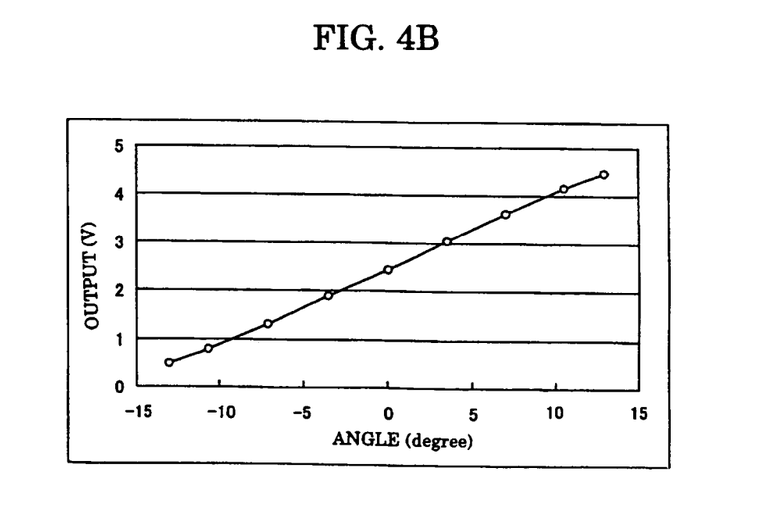
FIG. 4B is a graph plotting the output voltage versus detected angle of the angle detection apparatus of FIG. 4A.

With this construction, even when the differential output from the magnetism sensing element 202 is very small (e.g., a few tens of mV), the amount of rotation of the specular surface can be appropriately converted into an electrical signal, as shown in FIG. 4B. Further, the adverse effect of displacement of the magnet 26 and the magnetism sensing element 202 to the accuracy of the system, which would be caused by change in temperature, can be prevented so that the temperature dependence can be restricted. Consequently, according to the present embodiment, a mirror 18 having a high-performance angle detection apparatus 14 can be provided at a reduced cost.

Although the present invention has been described using an exemplary embodiment, the present invention is not limited to the illustrated embodiment.

It is contemplated that numerous modifications may be made to the exemplary embodiments of the invention without departing from the spirit and scope of the embodiments of the present invention as defined in the following claims.

INDUSTRIAL APPLICABILITY

The present invention is suitable for an automotive exterior mirror, for example.

What is claimed is:

1. An angle detection apparatus for detecting an angle of a specular surface, comprising:

a slide block stressed toward an interlocking member so that rotation of the interlocking member causes the slide block to move in a direction of movement substantially perpendicular to the specular surface by an amount proportional to an amount of the rotation of the interlocking member adapted to change orientation thereof together with the specular surface so as to orient in a direction in which the specular surface is orienting;

a movable member adapted to move in the direction of movement of the slide block by an amount proportional to an amount of the movement of the slide block;

a moving amount detection unit adapted to detect the amount of movement of the movable member, a first elastic member provided between the movable member and the slide block to stress the slide block toward the interlocking member; and a second elastic member adapted to stress the movable member toward the first elastic member, wherein the movement of the slide block causes the movable member to move in the direction of the movement of the slide block by an amount smaller than the amount of the movement of the slide block.

2. A mirror having a specular surface changeable in orientation, the mirror comprising:

an actuator adapted to rotate the specular surface about an axis parallel with the specular surface to change the orientation of the specular surface;

an interlocking member adapted to change orientation thereof together with the specular surface so as to orient in a direction in which the specular surface is orienting;

a slide block stressed toward the interlocking member so that rotation of the interlocking member causes the slide block to move in a direction of movement substantially perpendicular to the specular surface by an amount proportional to an amount of the rotation of the interlocking member;

a movable member adapted to move in the direction of movement of the slide block by an amount proportional to an amount of the movement of the slide block;

a moving amount detection unit adapted to detect the amount of movement of the movable member;

a first elastic member provided between the movable member and the slide block to stress the slide block toward the interlocking member; and a second elastic member adapted to stress the movable member toward the first elastic member, wherein the movement of the slide block causes the movable member to move in the direction of the movement of the slide block by an amount smaller than the amount of the movement of the slide block.

3. A mirror according to claim 2, wherein the interlocking member comprises a plate pivot adapted to rotate about the axis parallel with the specular surface so as to tilt the specular surface.

4. A mirror according to claim 2, wherein the movable member comprises a magnet; and wherein the moving amount detection unit comprises a magnetism sensing element adapted to detect magnetism derived from the magnet to output a signal corresponding to the amount of the movement of the movable member.

5. A mirror according to claim 4, wherein the magnet has a length shorter in a direction substantially perpendicular to the specular surface than a maximum distance covered by the movement of the slide block corresponding to a maximum range of rotation of the specular surface.

6. A mirror according to claim 4, wherein the magnetism sensing element comprises a Hall element applying a Hall voltage between first and second voltage output terminals; and wherein the mirror further comprises:

first and second temperature-compensating elements having a resistance decreasing or increasing according to increase in temperature, the first and second temperature-compensating elements connected to the first and second voltage output terminals respectively; and an operational amplifier adapted to amplify the Hall voltage received from the Hall element through the first and second temperature-compensating elements.

7. A mirror according to claim 4, further comprising a circuit board opposed to the interlocking member with the slide block and the magnet disposed between the circuit board and the interlocking member, wherein the magnetism sensing element is mounted on the circuit board.

8. A mirror according to claim 7, wherein the magnet has a length shorter in a direction substantially perpendicular to the specular surface than a maximum distance covered by the movement of the slide block corresponding to a maximum range of rotation of the specular surface.

9. A mirror according to claim 7, wherein the magnetism sensing element comprises a Hall element applying a Hall voltage between first and second voltage output terminals; and wherein the mirror further comprises:

first and second temperature-compensating elements having a resistance decreasing or increasing according to increase in temperature, the first and second temperature-compensating elements connected to the first and second voltage output terminals respectively; and an operational amplifier adapted to amplify the Hall voltage received from the Hall element through the first and second temperature-compensating elements.

10. A mirror having a mirror surface changeable in orientation, comprising:

an interlocking member configured to change the orientation of the mirror surface;

a slide block stressed toward the interlocking member so that movement of the interlocking member causes the slide block to move by a second amount proportional to a first amount of the movement of the interlocking member;

a movable member stressed toward the slide block so that movement of the movement of the slide block causes the movable member to move by a third amount proportional to the second amount of the movement of the slide block;

a first elastic member provided between the movable member and the slide block and configured to stress the slide block toward the interlocking member; and a second elastic member configured to stress the movable member toward the first elastic member, a moving amount detection unit configured to detect the third amount of movement of the movable member;

wherein the third amount of the movement of the movable member is smaller than the second amount of the movement of the slide block.

11. A mirror according to claim 10, wherein the interlocking member comprises a plate pivot configured to rotate about an axis parallel with the mirror surface so as to change the orientation of the mirror surface.

12. A mirror according to claim 10, wherein the movable member comprises a magnet; and the moving amount detection unit comprises a magnetism sensing element configured to detect magnetism derived from the magnet to output a signal corresponding to the third amount of the movement of the movable member.

13. A mirror according to claim 12, wherein the magnet has a length shorter in a direction substantially perpendicular to the mirror surface than a maximum distance covered by the movement of the slide block corresponding to a maximum range of the changeable orientation of the mirror surface.

14. A mirror according to claim 12, wherein the magnetism sensing element comprises:

a Hall element applying a Hall voltage between first and second voltage output terminals, and the mirror further comprises:

first and second temperature-compensating elements having a resistance decreasing or increasing according to increase in temperature, the first and second temperature-compensating elements connected to the first and second voltage output terminals respectively; and an operational amplifier adapted to amplify the Hall voltage received from the Hall element through the first and second temperature-compensating elements.

15. A mirror system according to claim 12, further comprising:

a circuit board opposed to the interlocking member with the slide block and the magnet disposed between the circuit board and the interlocking member, wherein the magnetism sensing element is mounted on the circuit board.

16. A mirror according to claim 15, wherein the magnet has a length shorter in a direction substantially perpendicular to the mirror surface than a maximum distance covered by the movement of the slide block corresponding to a maximum range of the changeable orientation of the mirror surface.

17. A mirror according to claim 15, wherein the magnetism sensing element comprises:

a Hall element applying a Hall voltage between first and second voltage output terminals, and the mirror further comprises:

first and second temperature-compensating elements having a resistance decreasing or increasing according to increase in temperature, the first and second temperature-compensating elements connected to the first and second voltage output terminals respectively; and an operational amplifier adapted to amplify the Hall voltage received from the Hall element through the first and second temperature-compensating elements.

* * * * *